United States Patent
Rancourt

(10) Patent No.: US 6,443,269 B1
(45) Date of Patent: Sep. 3, 2002

(54) ROTOR FOR DISC BRAKE ASSEMBLY

(76) Inventor: Yvon Rancourt, 779 Boulevard Industrial, Blainville, Quebec (CA), J7C 3V3

( * ) Notice: Subject to any disclaimer, the term of this patent is extended or adjusted under 35 U.S.C. 154(b) by 0 days.

(21) Appl. No.: 09/712,198

(22) Filed: Nov. 15, 2000

(30) Foreign Application Priority Data

Nov. 15, 1999 (CA) ............................................. 2289799

(51) Int. Cl.$^7$ .......................... F16D 55/12; F16D 55/02; F16D 65/12

(52) U.S. Cl. ............. 188/18 A; 188/71.6; 188/218 XL; 188/264 AA

(58) Field of Search ............................ 188/71.6, 264 A, 188/264 AA, 218 XL, 18 A, 73.2, 72.4, 366, 367; 301/6.8, 6.1, 6.3

(56) References Cited

U.S. PATENT DOCUMENTS

| | | | | |
|---|---|---|---|---|
| 4,026,393 A | * | 5/1977 | Gebhardt et al. | ..... 188/218 XL |
| 4,379,501 A | * | 4/1983 | Hagiwara et al. | ..... 188/218 XL |
| 5,330,034 A | | 7/1994 | Rancourt et al. | |
| RE35,055 E | | 10/1995 | Paquet et al. | |

FOREIGN PATENT DOCUMENTS

| | | | |
|---|---|---|---|
| DE | 1268917 | * | 12/1967 |
| DE | 4003732 | * | 8/1991 |
| FR | 1048935 | * | 12/1953 |
| WO | WO 9829671 | | 7/1998 |

* cited by examiner

*Primary Examiner*—Douglas C. Butler
(74) *Attorney, Agent, or Firm*—Birch, Stewart, Kolasch & Birch, LLP

(57) ABSTRACT

An annular disc brake assembly having a housing mounted to a vehicle and a rotor disc mounted to a wheel of the vehicle. Annular brake pads extend parallel to the rotor disc within the housing and are mounted thereto with at least one brake pad being movable axially by means of an oil applied bladder mounted to the housing and moving the first brake pad axially against the disc brake. The rotor disc is solid and has cooling fins on either side, just below the friction surfaces for dissipating the heat from the solid disc.

7 Claims, 3 Drawing Sheets

ROTOR FOR DISC BRAKE ASSEMBLY

BACKGROUND OF THE INVENTION

1. Field of the Invention

The present invention relates to disc brakes and more particularly to improvements in large area contact disc brakes for vehicles.

2. Description of the Prior Art

The concept of the full annular disc brake is proposed for automobiles and light trucks and the present invention relates to an improvement over the structure of a full annular disc brake for such vehicles as described in PCT published application WO98/29671 published Jul. 9, 1999 in the name of Yvon Rancourt. Disc brakes for full annular disc brakes for larger vehicles such as trucks are described in U.S. Pat. No. 5,330,034 issued Jul. 19, 1994 and U.S. RE 35055 issued Oct. 10, 1995.

There are obvious advantages in having a complete annular array of friction pads contacting an annular disc on both sides of the disc. The braking or thermal energy distribution is related directly to the thermal resistance associated with both sides of the interface where the heat is generated. In a full annular brake there is a large area to distribute the braking energy more efficiently.

It has also been found that vibrations between the inner and outer pads are the major causes for brake squeal.

In a brake system, dynamic loading produces stresses and strains, the magnitude and distribution of which will depend not only on the usual parameters encountered previously but also on the velocity of propagation of the strain waves through the material of which the system is composed. This latter consideration, although very important when loads are applied with high velocities, may often be neglected when the velocity of application of the load is low. Since dynamic loading is conveniently considered to be the transfer of energy from one system to another, the concept of configuration (strain energy) as an index of resistance to failure is important. One of the important concepts is that the energy-absorbing capacity of a member, that is, the resistance to failure is a function of the volume of material available, in contrast to the resistance to failure under static loading, which is a function of cross-sectional area or section modulus.

One of the main problems in adapting the technology of a full annular brake system of the type described in the above mentioned patents is the consideration of weight and cost. It would be unrealistic, no matter what the advantages, to assume that a new full annular brake system would be accepted on the market at a price substantially higher than present day disc brakes. Furthermore any increase of weight compromises the fuel consumption.

SUMMARY OF THE INVENTION

It is an aim of the present invention to provide a brake system, especially for automobiles, that has improved heat distribution properties, and reduces the occurrence of wear.

It is still a further aim of the present invention to provide an annular disc brake system where the maximum brake performance is obtained.

A construction in accordance with the present invention comprises a disc brake assembly for a vehicle wheel wherein the wheel includes a hub journaled to an axle on the vehicle, the disc brake assembly comprises a housing mounted to the vehicle and at least an annular rotor disc within the housing and means mounting the rotor disc to the wheel which comprises an annular hub portion, the rotor disc further including an annular peripheral portion and at least a first radial planar friction surface on the annular peripheral portion; the housing includes a first annular brake shoe provided adjacent the first planar friction surface of the disc and movable axially towards and away from the first friction surface; and the rotor comprising an annular array of axially extending cooling fins integral with the rotor between the hub portion and the peripheral portion.

In a more specific embodiment of the present invention the radial disc is provided with a second planar friction surface parallel to the first surface and the cooling fins are provided adjacent the first and second friction surfaces respectively.

In a still more specific embodiment of the present invention, the cooling fins have different radially and axially extending configurations in order to promote airflow turbulence and therefore enhance the heat dissipation characteristics of the rotor.

BRIEF DESCRIPTION OF THE DRAWINGS

The invention will now be described in detail having reference to the accompanying drawings in which.

DESCRIPTION OF THE PREFERRED EMBODIMENTS

Figure 1:
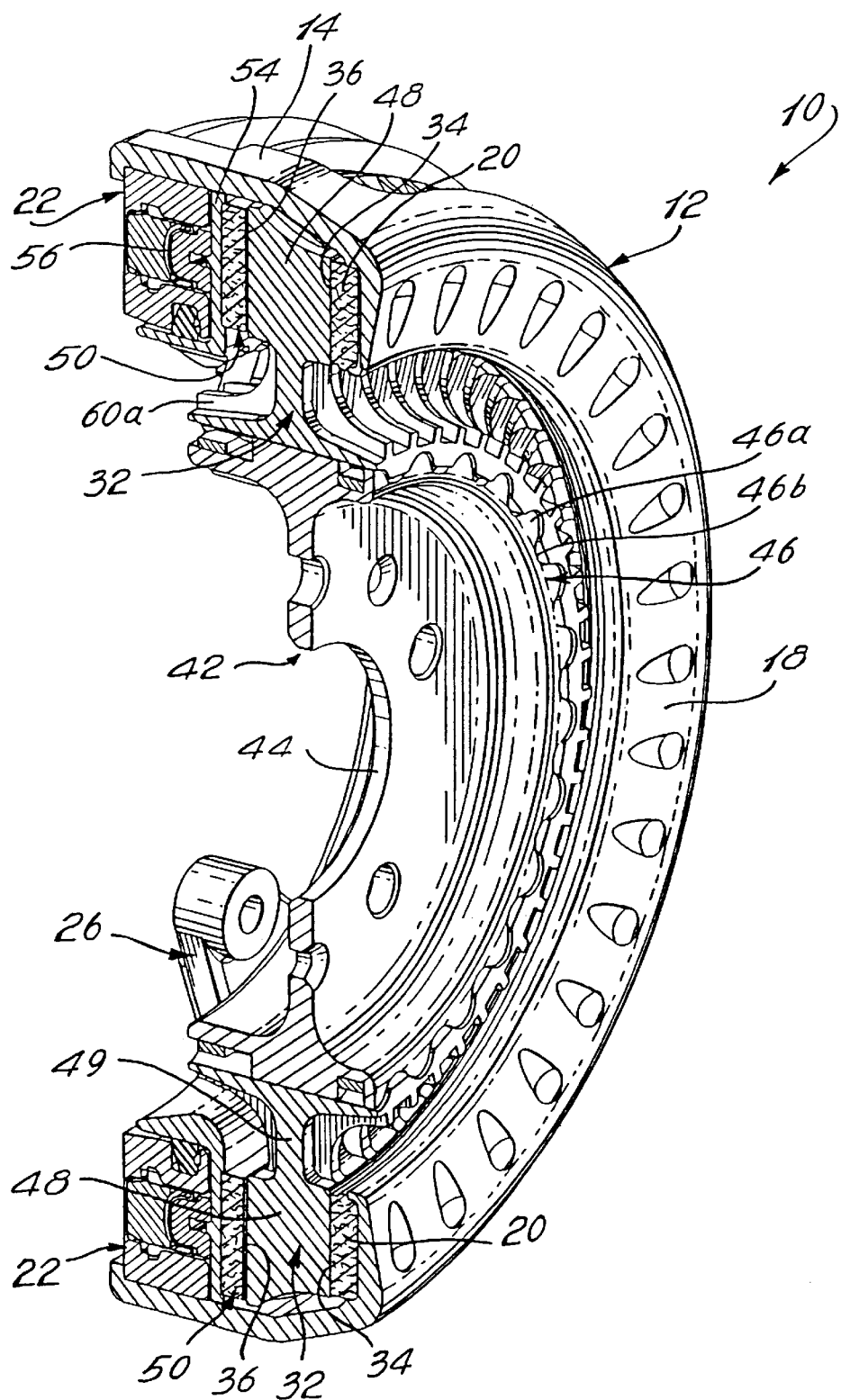
FIG. 1 is fragmentary perspective view partly in cross section of an embodiment of the assembled disc brake in accordance with the present invention.

Referring now to the drawings, and more particularly to FIGS. 1 to 4, a disc brake assembly 10 for an automobile is illustrated having a housing in the form of a shell 12. The housing has spider legs. The housing 12 includes a radial annular wall 18 provided with an annular brake pad lining 20.

The housing 12 also includes an annular radial wall 22. The radial wall 22 has a hub portion 26, which can be bolted to a flange on an axle (not shown), of the vehicle.

An annular rotor disc 32 includes radial planar friction surfaces 34 and 36 and a cylindrical annular rim 38 having an inner corrugated concentric surface 40 with ribs 40a and valleys 40b. A hub adapter 42 includes a radial wall portion 44 adapted to be mounted to a vehicle wheel and a cylindrical corrugated wall 46. The wall 46 has ribs 46a and valleys 46b that are adapted to fit within the inner surface 40 of the rim 38 of rotor disc 32. Thus, the rotor disc 32 will be locked against rotational movement relative to the hub adapter 42 but is slidable axially thereon. Since the hub adapter 42 is mounted onto a vehicle wheel the rotor disc 32 will rotate with the wheel.

Figure 2:
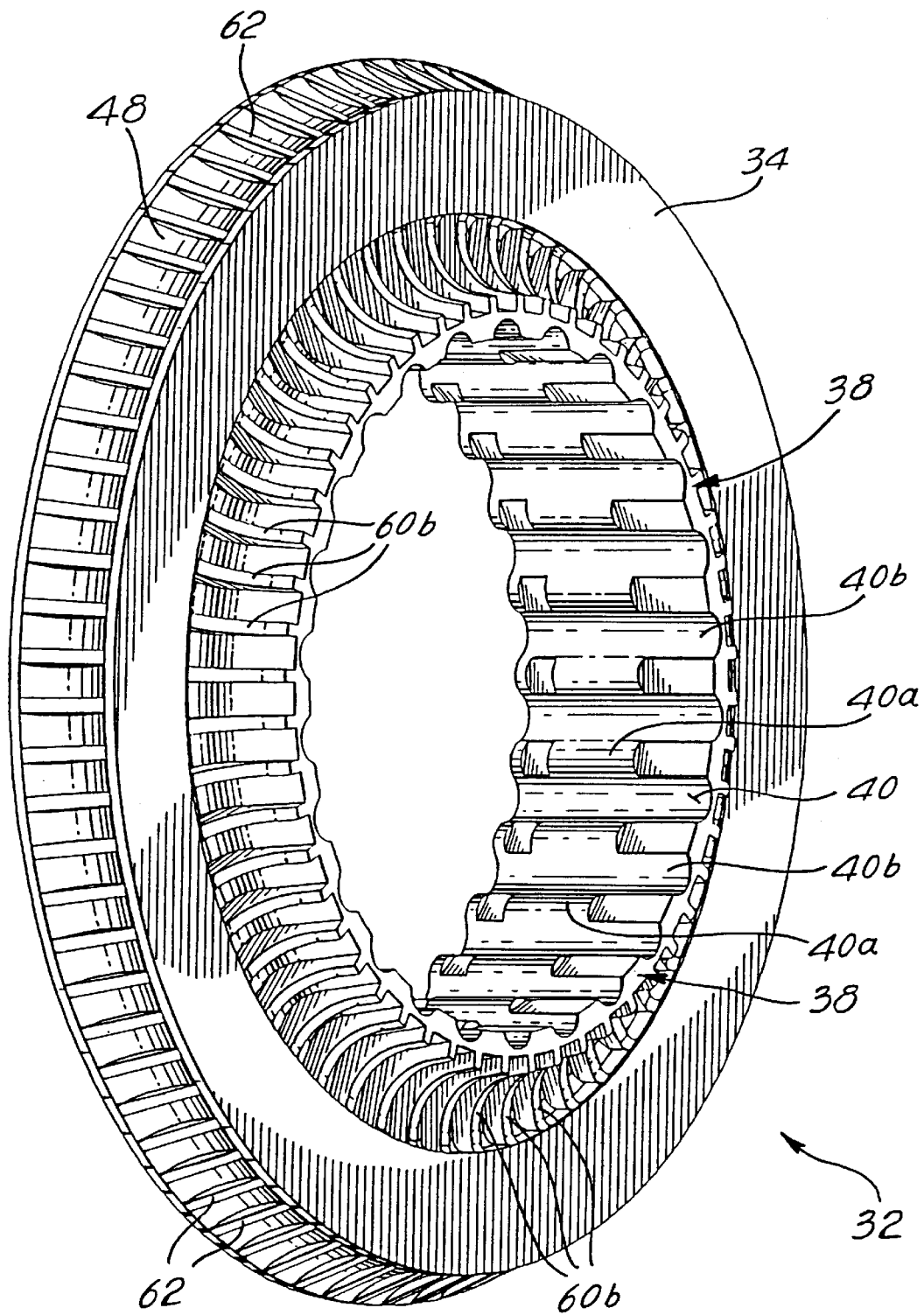
FIG. 2 is a perspective view of the rotor of the disc brake as shown in FIG. 1.

The rotor disc 32 includes an annular solid ring 48 that provides the friction surfaces 34 and 36. Between the annular rim 38 and the ring 48 is a relatively narrow neck portion 49. A plurality of cooling fins 60a and 60b are located, circumferentially spaced apart, on respective sides of the neck portion 49. The cooling fins 60a and 60b have an axial component and a radial component as shown in FIGS. 1 and 2.

Further cooling fins 62 are provided on the outer periphery of the annular ring 48. The cooling fins 60a and 60b, as well as 62, are sufficient to dissipate the heat generated in the solid annular ring 48 when brakes are applied to the disc 32.

Figure 3:
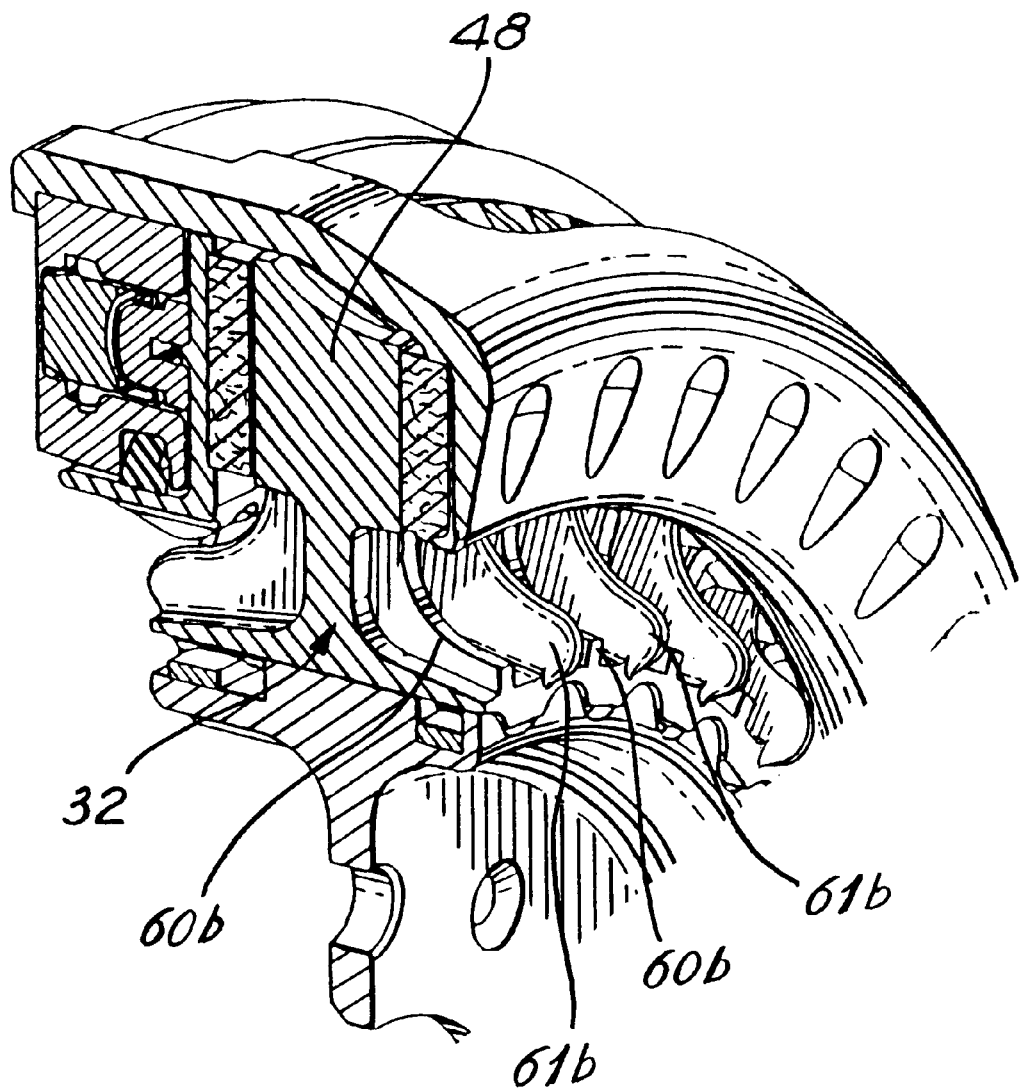
FIG. 3 is a fragmentary perspective view of another embodiment of the present invention.

It has also been found to be advantageous to vary the configuration of alternating cooling fins. For instance, in FIG. 3 there is shown a plurality of fins 60*a* and 61*a* on one side thereof, and 60*b* and 61*b* on the other side thereof. The cooling fins 60*b* are identical to those shown in FIG. 2. Cooling fins 61*b* have a slightly convex configuration as shown in FIG. 3. The purpose of varying the configuration of the cooling fins is to provoke air turbulence in the area of the cooling fins to thereby enhance the heat transfer as well as to reduce the harmonics that could produce undesirable noises.

A brake shoe 50 includes brake linings 52 and a backing plate 54. The brake shoe 50 can slide axially but is retained against rotational movement relative to the housing 12.

An annular bladder 56 is provided between the wall 32 and the backing plate 54. When fluid such as oil is fed into the bladder 56 it will expand, moving the brake shoe 50 axially towards the friction surface 36 of rotor disc 32. The rotor disc 32 will also slide axially on the hub 42, in response to the force exerted by the bladder 56, and the radial friction surface 34 will come in frictional contact with the brake linings 20. Thus, when it is necessary to apply the brakes, the bladder 56 is expanded. However, to release the brakes the oil is allowed to drain from the bladder 56, thereby releasing the axial force on the brake shoe 50, allowing the disc rotor 32 to rotate freely within the housing 12.

I claim:

1. A disc brake assembly comprising at least a housing, a rotatable hub and an annular rotor disc rotatable within the housing, an annular hub adapter mounting the rotor disc to the hub, the rotor disc further including an annular peripheral portion and at least a first radial planar friction surface on the annular peripheral portion; the housing includes a first annular brake shoe provided adjacent the first planar friction surface of the disc and movable axially towards and away from the first friction surface; an annular array of axially extending cooling fins integral with the rotor at the hub adapter wherein the hub adapter is in the form of a cylinder providing a rim and a narrow circumferential neck extending between the rim and the annular ring whereby the array of cooling fins are provided on either side of the neck.

2. The disc brake assembly as defined in claim 1, wherein the cooling fins extend in radial planes.

3. The disc brake assembly as defined in claim 1 wherein each array of cooling fins contain cooling fins of different configurations to cause air turbulence in the area of the friction surfaces to thereby the provide enhanced cooling thereof.

4. The disc brake assembly as defined in claim 3 wherein each of the cooling fins has a radial and axial component while some cooling fins have a concave edge while others have a convex edge.

5. The disc brake assembly as defined in claim 1 wherein an array of cooling fins is provide on both sides of the neck and adjacent the friction surfaces.

6. The disc brake assembly as defined in claim 1 wherein the peripheral portion is an annular ring and a pair of parallel friction surfaces are formed thereon.

7. A disc brake assembly comprising at least a housing, a rotatable hub and an annular rotor disc rotatable within the housing, an annular hub adapter mounting the rotor disc to the hub, the rotor disc further including an annular peripheral portion and at least a first radial planar friction surface on the annular peripheral portion; the housing includes a first annular brake shoe provided adjacent the first planar friction surface of the disc and movable axially towards and away from the first friction surface; wherein the annular peripheral portion includes a circumferential outer continuous portion with an array of circumferentially spaced apart axially extending cooling fins.

* * * * *